United States Patent
Hance et al.

(10) Patent No.: US 9,827,683 B1
(45) Date of Patent: Nov. 28, 2017

(54) COLLABORATIVE INVENTORY MONITORING

(71) Applicant: X Development LLC, Mountain View, CA (US)

(72) Inventors: Christopher Hance, Mountain View, CA (US); Daniel Shaffer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/222,638

(22) Filed: Jul. 28, 2016

(51) Int. Cl.
| | |
|---|---|
| *B25J 9/16* | (2006.01) |
| *G06K 7/10* | (2006.01) |
| *B25J 19/02* | (2006.01) |
| *G05B 19/12* | (2006.01) |
| *G06K 19/06* | (2006.01) |
| *G06Q 10/08* | (2012.01) |
| *B65G 1/137* | (2006.01) |
| *B65G 1/06* | (2006.01) |

(52) U.S. Cl.
CPC ............ *B25J 19/021* (2013.01); *B25J 9/162* (2013.01); *B65G 1/065* (2013.01); *B65G 1/1375* (2013.01); *G05B 19/124* (2013.01); *G06K 7/10861* (2013.01); *G06K 19/06028* (2013.01); *G06K 19/06037* (2013.01); *G06Q 10/087* (2013.01)

(58) Field of Classification Search
CPC .......................... B25J 9/162; G06K 7/10861
See application file for complete search history.

(56) References Cited

U.S. PATENT DOCUMENTS

| | | | | |
|---|---|---|---|---|
| 7,769,221 B1 * | 8/2010 | Shakes | ...................... | B07C 3/14 |
| | | | | 382/141 |
| 7,899,243 B2 * | 3/2011 | Boncyk | ..................... | A61F 9/08 |
| | | | | 382/165 |
| 8,639,644 B1 | 1/2014 | Hickman et al. | | |
| 8,731,708 B2 * | 5/2014 | Shakes | .................. | G06Q 10/08 |
| | | | | 700/216 |
| 8,798,784 B1 * | 8/2014 | Clark | ..................... | G06Q 10/08 |
| | | | | 198/431 |

(Continued)

OTHER PUBLICATIONS

International Searching Authority, International Search Report and Written Opinion dated Oct. 17, 2017, issued in connection with International Application No. PCT/US2017/040764, filed on Jul. 5, 2017.

*Primary Examiner* — Thomas Randazzo
(74) *Attorney, Agent, or Firm* — McDonnell Boehnen Hulbert & Berghoff LLP

(57) ABSTRACT

An example method is carried out in a warehouse environment having a plurality of inventory items located therein, each having a corresponding on-item identifier. The method involves determining a target inventory item having a target on-item identifier. The method also involves determining that a first inventory item having a first on-item identifier is loaded onto a first robotic device. The method further involves transmitting a request to verify the first on-item identifier. The method still further involves receiving data captured by a sensor of the second robotic device. The method yet further involves (i) analyzing the received data to determine the first on-item identifier, (ii) comparing the first on-item identifier and the target on-item identifier, and (iii) responsive to comparing the first on-item identifier and the target on-item identifier, performing an action.

20 Claims, 10 Drawing Sheets

(56) References Cited

U.S. PATENT DOCUMENTS

| | | | |
|---|---|---|---|
| 8,952,284 B1* | 2/2015 | Wong | B07C 5/3412 |
| | | | 209/586 |
| 9,120,622 B1 | 9/2015 | Elazary et al. | |
| 9,489,655 B1* | 11/2016 | Lecky | G06Q 10/0875 |
| 9,492,923 B2* | 11/2016 | Wellman | B25J 9/1612 |
| 9,561,587 B2* | 2/2017 | Wellman | B25J 9/1612 |
| 2005/0269412 A1* | 12/2005 | Chiu | G06K 9/4633 |
| | | | 235/462.03 |
| 2006/0174129 A1* | 8/2006 | Brignone | H04L 9/3236 |
| | | | 713/181 |
| 2008/0001372 A1 | 1/2008 | Hoffman et al. | |
| 2008/0077511 A1 | 3/2008 | Zimmerman | |
| 2010/0019035 A1 | 1/2010 | Larson et al. | |
| 2014/0156472 A1* | 6/2014 | Stuntebeck | G06Q 10/087 |
| | | | 705/28 |
| 2014/0277691 A1 | 9/2014 | Jacobus et al. | |
| 2014/0309809 A1 | 10/2014 | Dixon et al. | |
| 2015/0032252 A1* | 1/2015 | Galluzzo | B25J 5/007 |
| | | | 700/218 |
| 2015/0368078 A1 | 12/2015 | Hess et al. | |
| 2016/0121487 A1 | 5/2016 | Mohan et al. | |
| 2016/0124434 A1 | 5/2016 | Gariepy et al. | |
| 2017/0113352 A1* | 4/2017 | Lutz | B25J 9/1697 |

\* cited by examiner

COLLABORATIVE INVENTORY MONITORING

BACKGROUND

One or more robotic devices and/or other actors can move throughout a storage environment to perform actions related to the storage and shipment of items. One example storage environment is a warehouse, which may be an enclosed building having rows of storage racks on which items may be stored. In some cases, the items may be stored on pallets, and the pallets may be stacked vertically. The warehouse may also include a loading dock used for loading and/or unloading items and pallets from delivery trucks or other types of vehicles.

The pallet may include a barcode which identifies the pallet. A centralized system may store information corresponding to the barcode, such as the number of items on the pallet, type of item, and location of the pallet within the warehouse. The centralized system may include similar information for all pallets included in the warehouse, such that the centralized system contains an inventory of the warehouse.

SUMMARY

The systems, methods, and devices may include one or more robotic devices that can navigate through the warehouse and monitor their surroundings by using cameras. The cameras may capture image data that can include inventory items, shelves, objects, and other robotic devices. In some instances, one robotic device may be tasked with transporting inventory items from one location to another. But this first robotic device may have an obstructed view of an inventory item, or may not be able to capture an identifier associated with an inventory item as it expects. In that case, a second robotic device may be sent to the first robotic device to aid in verifying the inventory item. The second robotic device may act as a mirror for the first robotic device, allowing the first robotic device and/or a central computing system to obtain correct information. As such, example systems, methods, and devices may help build and maintain an accurate inventory of pallets, boxes, shelves, robotic devices, and other items located in a warehouse environment, and/or help to detect when items are not where an inventory management system believes them to be, among other possible benefits. (Of course, these and other possible benefits described herein are not to be construed as limiting.)

In one example, a method is disclosed. The method is carried out in a warehouse environment having a plurality of inventory items located therein, each having a corresponding on-item identifier. The method involves determining a target inventory item from the plurality of inventory items, the target inventory item having a target on-item identifier. The method also involves determining that a first inventory item having a first on-item identifier is loaded onto a first robotic device. The method also involves transmitting, by the first robotic device to a second robotic device, a request to verify the first on-item identifier. The method further involves receiving data captured by a sensor of the second robotic device. The method yet further involves analyzing the received data to determine the first on-item identifier. The method still further involves comparing the first on-item identifier and the target on-item identifier. The method further involves, responsive to comparing the first on-item identifier and the target on-item identifier, performing an action.

In another example, a warehouse management system is disclosed. The system includes one or more communication interfaces operable for communication with a plurality of robotic devices comprising at least a first robotic device and a second robotic device, wherein the first and second robotic devices are deployed in a warehouse environment having a plurality of inventory items that each have corresponding on-item identifiers. The system also includes at least one processor. The system further includes program instructions stored on a non-transitory computer readable medium and executable by the at least one processor to determine a target inventory item from the plurality of inventory items, the target inventory item having a target on-item identifier. The instructions are also executable to transmit a request to the second robotic device to verify a first on-item identifier corresponding to a first inventory item transported by the first robotic device. The instructions are also executable to receive data captured by a sensor of the second robotic device. The instructions are also executable to analyze the received data to determine the first on-item identifier. The instructions are also executable to compare the first on-item identifier to the target on-item identifier. And the instructions are further executable to, responsive to comparing the first on-item identifier and the target on-item identifier, perform an action.

In a third example, a method is disclosed. The method is carried out in a warehouse environment having a plurality of inventory items located therein, each having a corresponding on-item identifier. The method involves determining a target inventory item from the plurality of inventory items, the target inventory item having a target on-item identifier. The method also involves selecting, for transportation by a first robotic device deployed in the warehouse environment, a first inventory item having a first on-item identifier. The method also involves transmitting, to a second robotic device, a request to verify the first on-item identifier. The method further involves receiving data captured by a sensor of the second robotic device. The method still further involves analyzing the received data to determine the first on-item identifier. The method yet further involves comparing the first on-item identifier and the target on-item identifier. The method yet further involves, responsive to comparing the first on-item identifier and the target on-item identifier, performing an action.

In another example, a control system is described. The control system includes means for determining a target inventory item from the plurality of inventory items, the target inventory item having a target on-item identifier. The control system also includes means for selecting, for transportation by a first robotic device deployed in the warehouse environment, a first inventory item having a first on-item identifier. The control system further includes means for transmitting, to a second robotic device, a request to verify the first on-item identifier. The control system still further includes means for (i) receiving data captured by a camera of the second robotic device, (ii) analyzing the received data to determine the first on-item identifier, (iii) comparing the first on-item identifier and the target on-item identifier, and (iv) responsive to comparing the first on-item identifier and the target on-item identifier, performing an action.

The foregoing summary is illustrative only and is not intended to be in any way limiting. In addition to the illustrative aspects, embodiments, and features described above, further aspects, embodiments, and features will

DETAILED DESCRIPTION

Figure 1A:
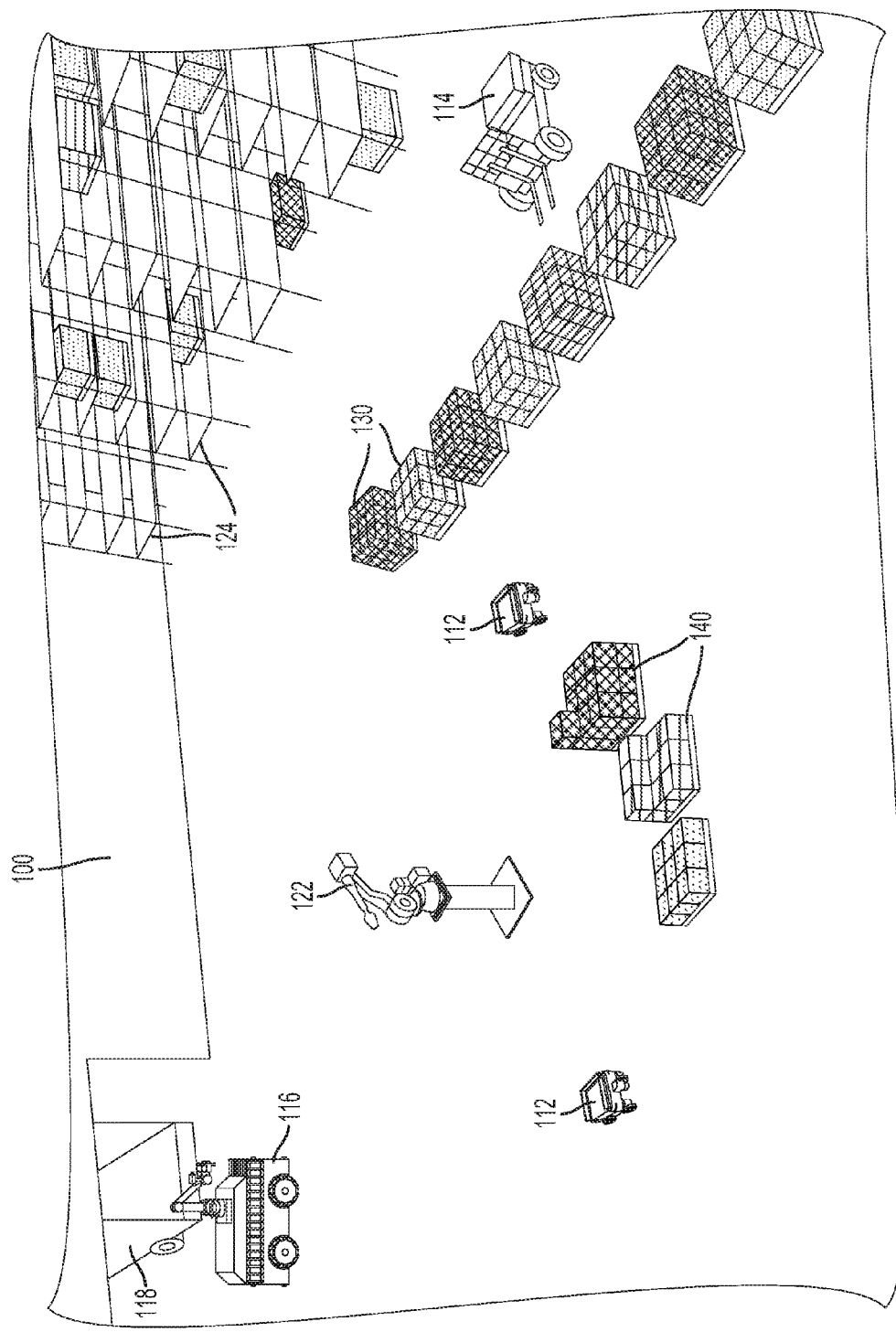
FIG. 1A illustrates a robotic fleet, according to an example implementation.

Example methods, systems, and devices are described herein. Any example embodiment or feature described herein is not to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

During normal or typical operation of a warehouse, pallets and items are routinely moved from one location to another by robotic devices, such as pallet jacks. Within this specification, the term "pallet jack" may be used as a stand in for any applicable robotic device, and any description of a pallet jack may apply to one or more other types of robotic devices operating within the warehouse environment. As such, acts, functions, and operations of the pallet jack may include interactions with both palletized and non-palletized objects.

In some warehousing systems, a pallet jack may include a camera or sensor that can read a barcode or other identifier, as described herein, identifying an item or pallet. However, in some cases, an identifier may be obscured, misplaced, or otherwise difficult for the pallet jack to read. This is especially so in the case of an item that a pallet jack is itself transporting, since its cameras or other sensors, as described herein, may be oriented outward to capture the pallet jack's environment. As such, the items a pallet jack is carrying may be outside of the pallet jack sensor's field of view. In addition, during transit from one location to the other, one or more items may fall off the pallet. As a result, it may be difficult for a given pallet jack to determine the correct pallet to transport from one location to another, or to determine if the pallet contains the correct number of items. In an environment where a pallet jack is an autonomous or semi-autonomous vehicle, and a human is not able to observe every item and action carried out by a pallet jack, the above problems may be significant. Further, in some cases the location of a given pallet in the warehouse may differ from the location of the pallet stored by a robotic device and/or centralized system. This may be due to an unintentional movement of the pallet, a mistake in updating information, mislabeling a pallet or location of a pallet, or other error. As a result, a percentage of the inventory of the warehouse may be lost or misplaced, which can cause delays in shipping items to customers and can require resources to find the lost or misplaced items. Example embodiments described herein may help to address such issues.

An example warehouse may be a fulfillment warehouse in which items are selected, sorted, and packaged for shipment to customers. Items may be arranged or organized within the warehouse to improve efficiency of this process based on customer demand, product size, weight, shape, or other characteristic. Items may be stored on pallets, which may be stacked on top of each other and/or on shelves that extend upwards (e.g., multi-level shelving). Further, each item, pallet, and/or shelf may include a visual identifier such as a barcode or Quick Response (QR) code that identifies the item, pallet, and/or shelf.

A computer-based warehouse management system (WMS) may be implemented for the warehouse. The WMS may include a database for storing information related to the items, pallets, and shelves, as well as one or more actors operating in the warehouse. For instance, the WMS may include information about the location of each item, pallet, shelf, and/or actor. This information may be used to coordinate the actors to allow them to carry out one or more functions, such as fulfilling an order for a customer. It may also be used to build and/or maintain an inventory of the warehouse.

The actors operating in the warehouse may include robotic devices such as autonomous guided vehicles (AGVs). Example AGVs may include pallet jacks, fork trucks, truck loaders/unloaders, and other devices. Each device may be autonomous or partially autonomous. Human-operated devices are also possible. Further, each device may include a vision system having a camera, such that the device can navigate through the warehouse.

A. Multipurpose Camera

Advantageously, an example robotic device may be deployed in a warehouse environment, and may use its pre-existing camera system for both navigation and inventory management. Specifically, a pallet jack may already be equipped with a stereo vision camera system (e.g., a stereo camera pair), which the pallet jack may use to sense its environment and navigate through the warehouse. The image data captured for navigation purposes may include images of pallets, other pallet jacks or devices, and other objects in the environment. As such, barcodes on the pallets may be detected in the image data, and combined with location information to determine the locations of the pallets in the warehouse. When numerous pallet jacks are moving about in a warehouse, the WMS may combine such information from the pallet jacks to improve inventory management of pallets in the warehouse.

In one example, a robotic device operating in the warehouse may be an autonomous pallet jack. The autonomous pallet jack may include a guidance system used to guide the autonomous pallet jack through the warehouse. The guidance system may include a camera, a GPS receiver, and/or other devices or systems. The camera may be mounted in a fixed position on the pallet jack, or may be mounted such that it can be turned or aimed in two or three dimensions, such as on a gimbal or swiveling mechanism. The camera may be configured to receive visual data about the surroundings of the autonomous forklift. Based on the received visual data, the autonomous pallet jack may be able to determine its position and orientation within the warehouse, and may be able to move from one location to another location while avoiding obstacles along the way.

The guidance system camera may be specially configured for the task of guidance. For example, the camera may include two optical receivers (i.e., a stereo camera), which may allow for more accurate depth perception and better position and orientation measurement, as well as better object avoidance. The guidance system camera may also be angled downward toward the ground, where objects are more likely to obstruct the autonomous forklift.

In some examples, the autonomous forklift may use the guidance system camera for other purposes in addition to guidance. For instance, when the autonomous forklift is near an item, pallet, or shelf the guidance system camera may capture an image of a barcode corresponding to the item, pallet, or shelf. When a barcode associated with a pallet is captured, the location of the pallet within the warehouse may be determined based on the location of the guidance system camera that captured the barcode. The barcode, location of the pallet, location of the autonomous forklift, and/or other information may be transmitted to the WMS, which may then compare with an expected location of the pallet. Where there is a discrepancy, the WMS may take action to fix the issue by dispatching an agent, generating and/or sending an alert, adding the pallet to a list of misplaced pallets, or taking another action.

In some examples, a guidance system camera may capture the barcode of each item, pallet, and/or shelf that it can see. Data may be transmitted to the WMS constantly or at regular intervals to provide a continuous check on the location of items, pallets, and shelves within the warehouse. Further, some examples may include the guidance system camera of multiple robotic devices operating within the warehouse environment, such that each robotic device transmits data to the WMS, and a constant or regular inventory location check is being performed.

In further examples, the movement of an AGV and/or the orientation of a guidance system camera on an AGV may be actively steered in order to obtain more item inventory data. For instance, the guidance system camera may be angled upwards and/or to the side of the AGV while it moves through the warehouse in order to attempt to capture barcodes of items that are placed above and to the side of the AGV (such as on shelves placed along an aisle). Further, the AGV and/or camera may be steered toward items that have not been updated recently, to provide the WMS with more up-to-date information on those items. For example, the north side of shelves in an aisle may include items that have not been scanned or checked recently. When an AGV travels down this aisle, the guidance camera may be angled toward the north side of shelves to capture barcodes of the items stored thereon, in order to update the information in the WMS.

Still further examples may include balancing the need for an inventory update with the need for safe and accurate navigation of a robotic device. This may involve weighing the value or importance of information that could be gained by using the guidance camera to scan items against the expected decrease in accuracy of navigation of the robotic device. A guidance camera on an AGV may be angled upwards in order to capture information about items stored on higher shelves. But this information may come at a cost, because the camera may no longer be able to see obstacles on the ground as easily. This trade-off may be beneficial, especially where the item information gained by angling the camera upward is valuable and the likelihood of running into an obstacle is small.

In some embodiments a specially tailored robotic device may be used to gather data about the location of items, pallets, shelves, and robotic devices within the warehouse. The specially tailored robotic device may include a standalone camera that can be used to capture the barcodes of items, pallets, shelves, and/or robotic devices that it views. The standalone camera may have a wide angle lens and/or may include the ability to rasterize such that barcodes may be captured more accurately and easily.

B. Using Multiple Sensors

Items and pallets may be transported from location to location within the warehouse. In one example, an autonomous pallet jack may be tasked with moving a pallet of items from a first location to a second location. To carry out this task, several steps may be performed. First, the pallet jack may determine the location of the pallet it seeks to move. Next, it may travel to that location and find the pallet, such as by reading nearby barcodes and identifying the sought after pallet. Then, the pallet jack may transport the pallet from the first location to the second location.

Several issues may arise when the pallet jack attempts to carry out this task. First, the location of the pallet may be incorrect. This may be due to incorrect information or a misplaced pallet, among other reasons. Second, the barcode identifying the pallet may be obscured, misplaced on the pallet, or otherwise difficult or impossible for the pallet jack to read. For instance, the pallet may be located on a shelf with the barcode placed on the side of the pallet opposite an aisle in which the pallet jack is located. Third, during transit from the first location to the second location, one or more items may fall off the pallet.

In order to fix these problems, as well as others, an example system may utilize multiple pallet jacks collecting and sharing information with a warehouse management system (WMS) and/or amongst one another. In some cases the pallet jacks may be connected to a WMS storing inventory information related to the items, pallets, and shelves, as well as the pallet jacks and other robotic devices operating in the warehouse. The WMS may also coordinate between the pallet jacks to keep an updated list of the locations and other characteristics of the items, pallets, shelves, and robotic devices. In other cases, pallet jacks may form a peer-to-peer network communicating with each other to store and update information related to items, pallets, shelves, and each other.

In one example, a first pallet jack may be carrying a pallet from one location to another in a warehouse. The warehouse may also include a second pallet jack and a WMS to manage the warehouse. While the first pallet jack is carrying the pallet, it may be unable to verify which pallet it is carrying and/or the contents of the pallet. This may be due to the positioning and view of the first pallet jack's camera. Although the first pallet jack could set the pallet down to get a different view, it may be advantageous to verify the identity and/or contents of the pallet via another means. The first pallet jack and/or WMS may transmit a message to the second pallet jack requesting verification of the identity and/or contents of the pallet. The second pallet jack may have a camera with a better view of the pallet, and may be able to scan a barcode or identify the contents of the pallet. This information may then be shared with the WMS and/or first pallet jack. In this manner the second pallet jack may act as a "mirror" for the first pallet jack, allowing the first pallet jack to gather information about the pallet it is carrying that it would otherwise not be able. The first pallet jack may thus be able to "see" itself by utilizing the resources of the second pallet jack.

In some examples, this "mirroring" may be performed without an explicit request from a first pallet jack. In a warehouse that includes multiple pallet jacks, each pallet jack may verify the contents of one or more other pallet jacks as they pass each other or otherwise travel near each other during ordinary operation or performance of tasks. Still further, the WMS may coordinate the routes or positions of one or more pallet jacks such that they pass each other and perform a verification on each other.

Some examples may include pallet jacks that can measure the weight of pallets they are carrying. The measured weight may be used as an indicator that a first pallet jack should request that a second pallet jack verify the contents of the first pallet jack. An expected weight of the pallet may be stored by the WMS. The pallet jack may weigh a pallet to determine an actual weight. When a discrepancy between the expected weight and actual weight is detected, the pallet jack and/or WMS may take action. This action may include dispatching a second pallet jack to verify the pallet and/or contents of the pallet. It may also include causing the pallet jack to bring the pallet to predetermined location or along a predetermined route, such that one or more cameras or other devices can verify the pallet and/or contents of the pallet.

During typical warehouse operations, pallets and items are routinely moved from one location to another by robotic devices, such as pallet jacks. Within this specification, the term "pallet jack" may be used as a stand in for any applicable robotic device, and any description of a pallet jack may apply to one or more other types of robotic devices operating within the warehouse environment. As such, acts, functions, and operations of the pallet jack may include interactions with both palletized and non-palletized objects.

II. Example Environment

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks or shelving for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quad-copters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
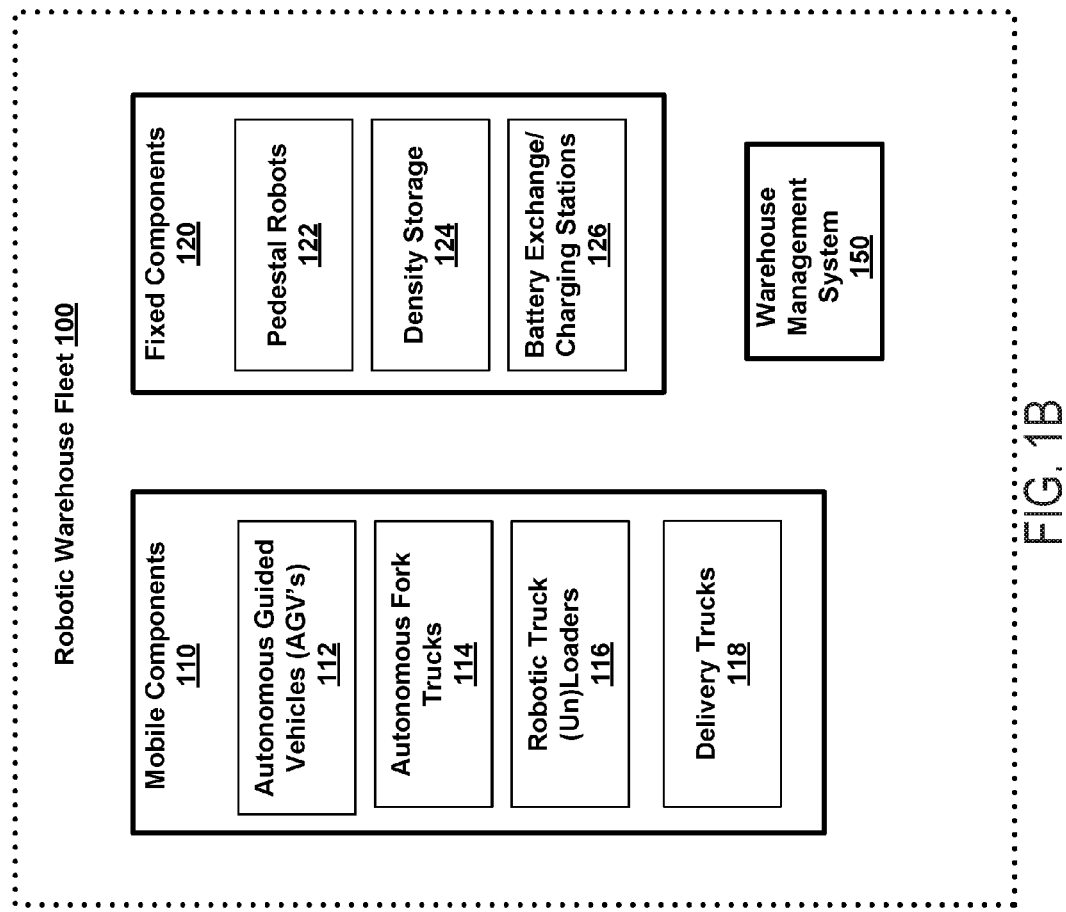
FIG. 1B illustrates a functional block diagram showing components of a robotic fleet, according to an example implementation.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a warehouse management system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, warehouse management system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, warehouse management system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by barcode, QR code, augmented reality tag (AR tag), or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a warehouse management system may sometimes fail, such as when a robot gets stuck or when packages get dropped in a location and lost. Local robot vision may also therefore provide robustness by inserting redundancy to handle cases where the warehouse management system fails in part. For instance, as an automatic pallet jack passes and identifies an object, the pallet jack may send information up to a remote, cloud-based server system. Such information may be used to fix errors in central planning, help to localize robotic devices, or to identify lost objects.

In further examples, a warehouse management system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). In addition, the map could show the current location of all items within the warehouse (or across multiple warehouses).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a warehouse management system. For instance, individual mobile robots may be configured to monitor their battery charge status. The robots may periodically send information to the warehouse management system indicating the status of their batteries. This information may then be used by the warehouse management system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, warehouse management system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
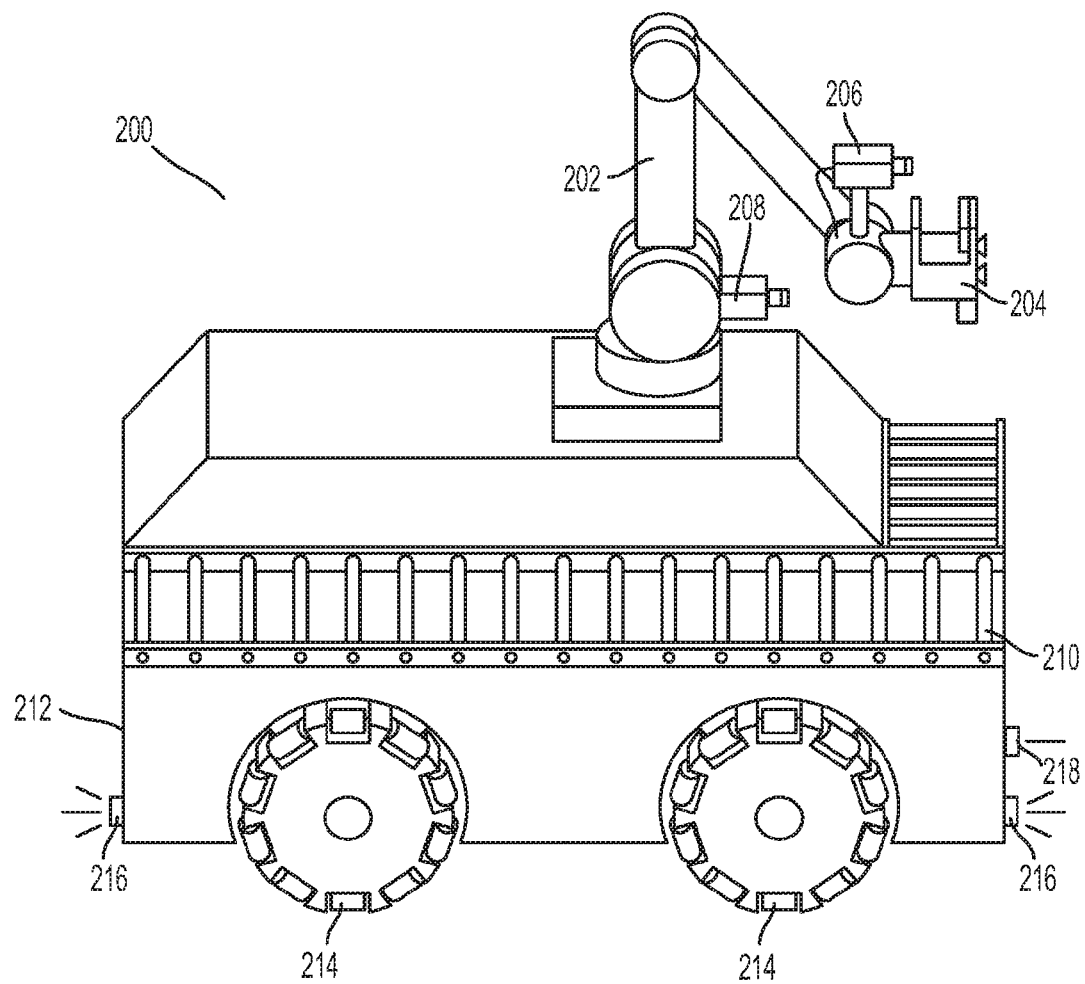
FIG. 2A illustrates a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap-around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a navigation sensors 216, safety sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
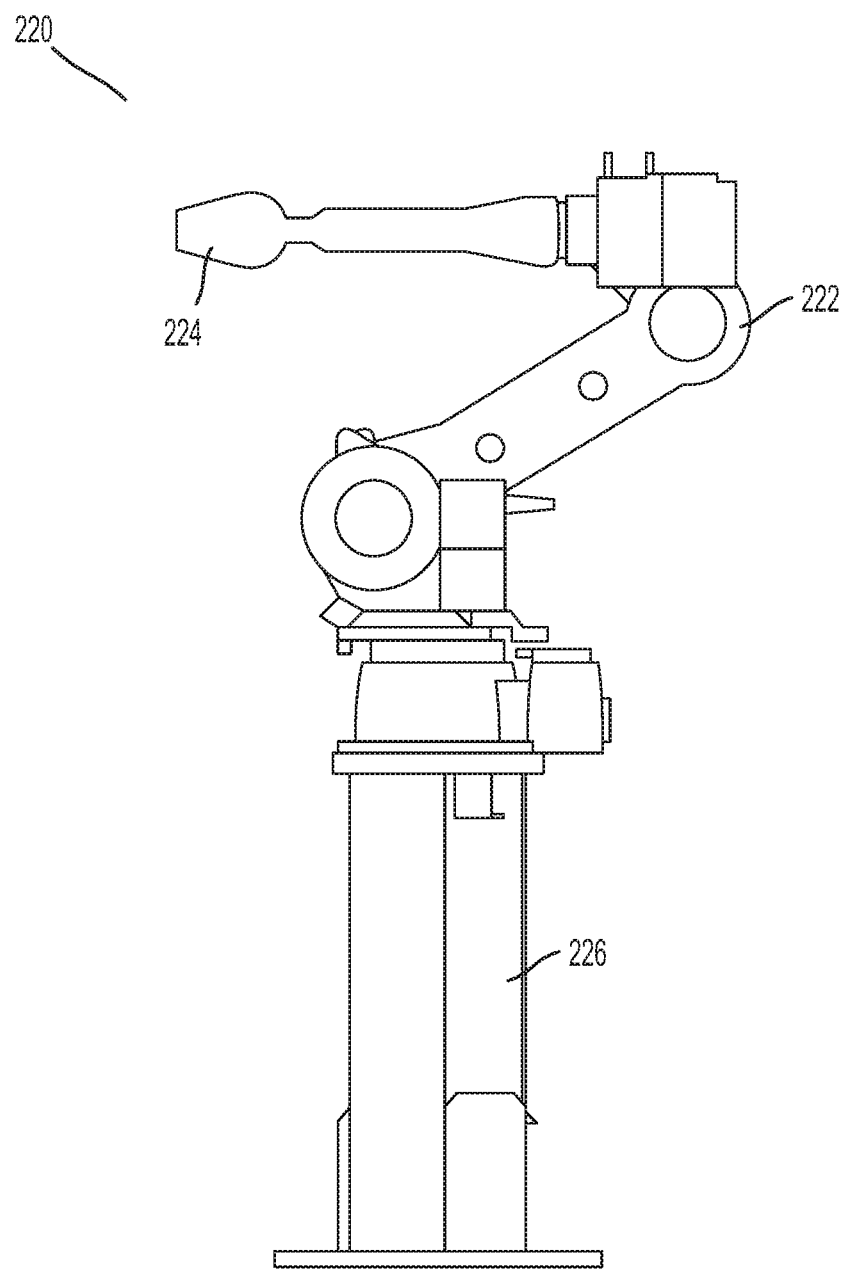
FIG. 2B illustrates a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
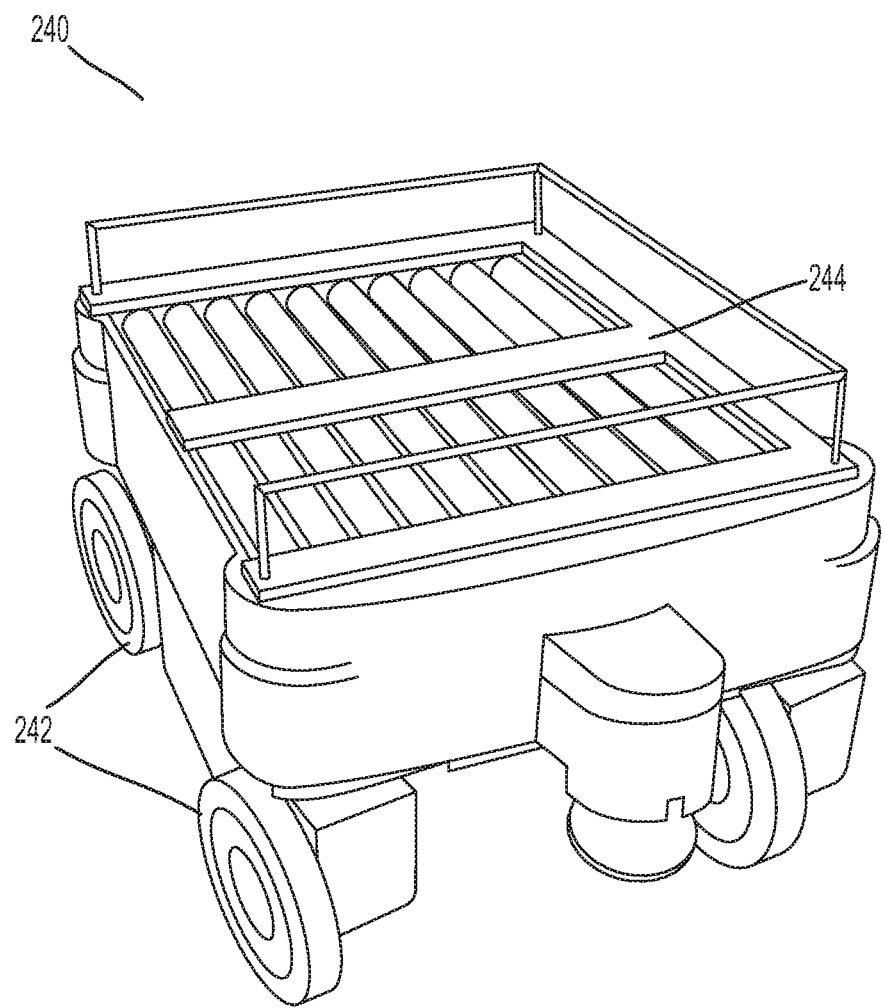
FIG. 2C illustrates an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
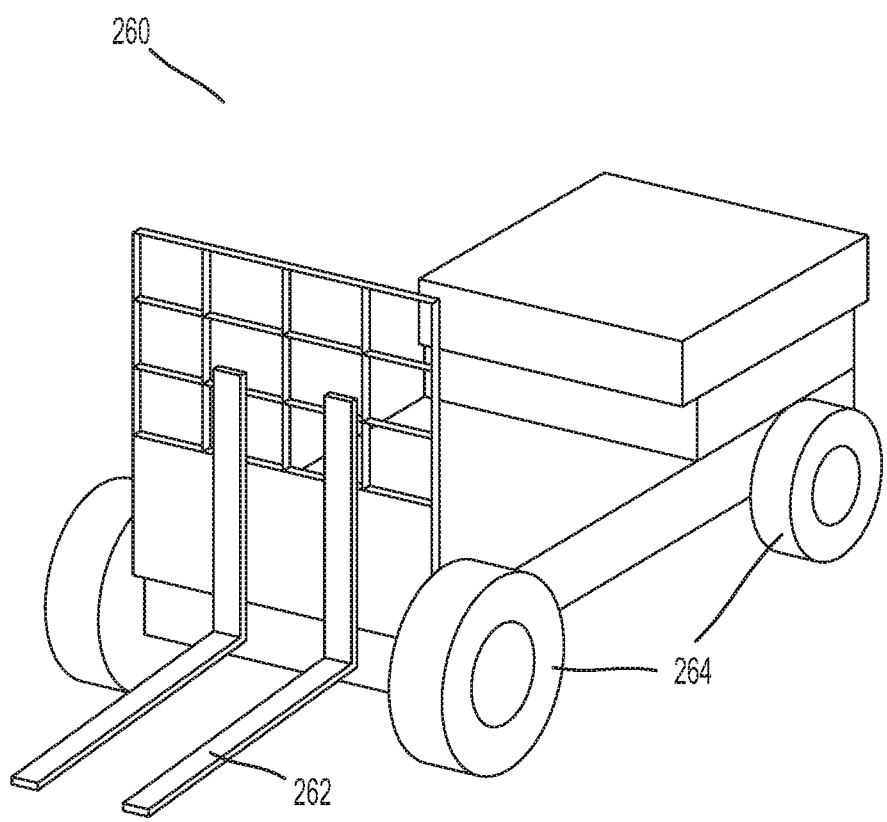
FIG. 2D illustrates an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Example methods and systems disclosed herein may be carried out and/or located in a warehouse environment such as the environment shown in FIG. 1. As discussed above, the warehouse environment may include a single or multiple room structure, and/or covered or uncovered areas such as a loading dock area. The warehouse environment may include a plurality of inventory items, such as pallets, boxes, shelves, or other items. These inventory items may be arranged and stored on shelves organized into aisles within the warehouse environment. This organization may allow a robotic device to navigate through the aisles to access one or more inventory items. The warehouse environment may also include one or more tags, fiducial markers, visual identifiers, beacons, markings, or other indicators that may be used for navigation of a robotic device.

In some examples, each inventory item in the warehouse environment may include an identifier that a sensor can detect, allowing the sensor and/or a connected computing device to identify the item. The identifier may be a barcode, QR code, RFID chip, or other identifier that can be placed on or in the item. In other examples, an inventory item's shape, size, color, texture, or other characteristic of the item itself may be used to identify the item.

In some examples, barcodes may be used as visual identifiers associated with each inventory item. Each barcode may be placed on the outside of the inventory item, such as on the packaging or wrapping. It may be beneficial to place the identifier for each item in the same or similar location on the items, such as in the upper right corner of one face, such that a robotic device can find the identifiers faster and more reliably. In other examples, an RFID tag identifier or other tag may be placed inside the item packaging itself. Examples described herein that refer to an on-item visual identifier may also apply to non-visual identifiers, such as RFID tags. Further, one or more sensors may be used in various examples to capture, detect, determine, or otherwise identify one or more on-item identifiers.

Figure 3A:
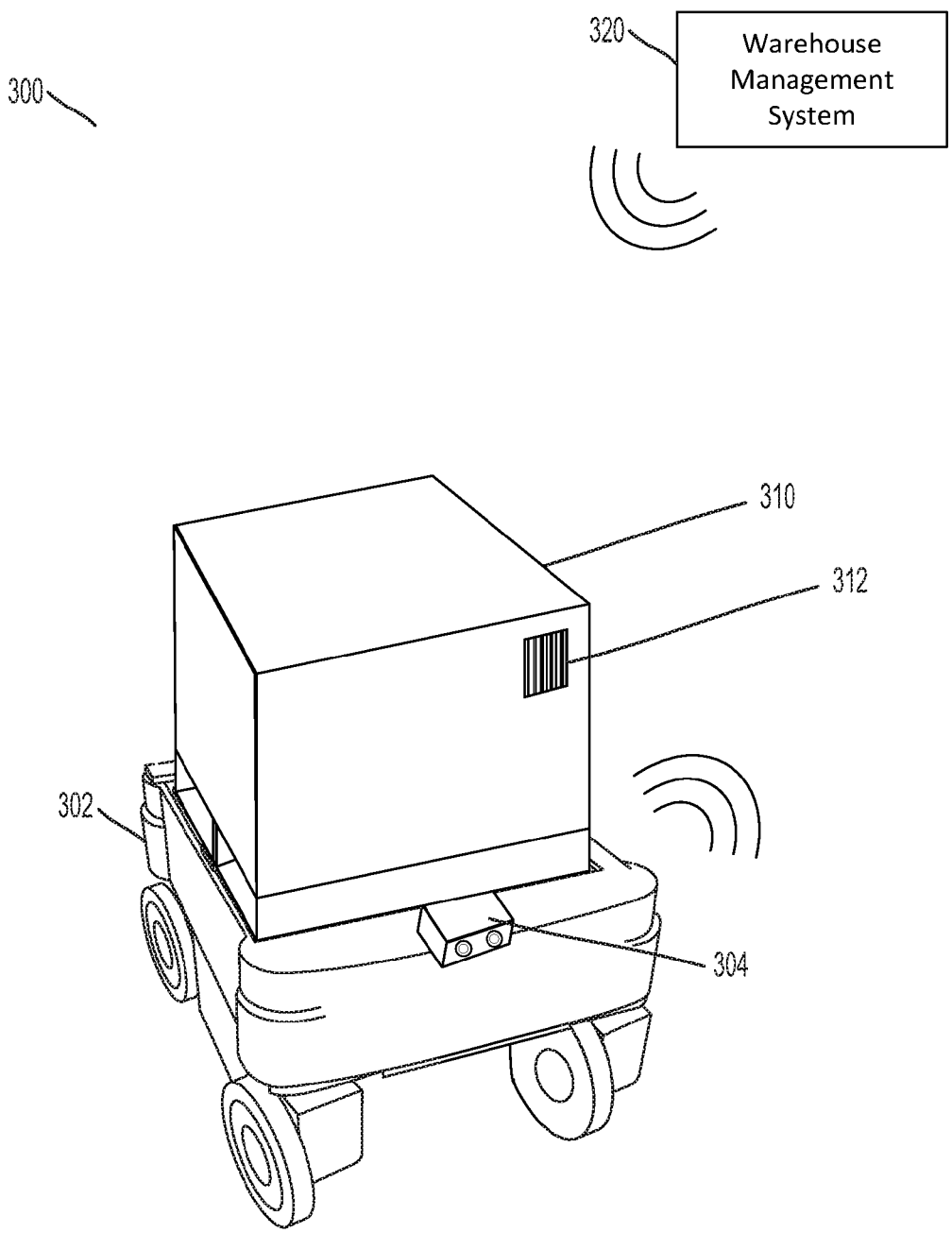
FIGS. 3A-3B illustrate a system, according to an example implementation.
Figure 3B:
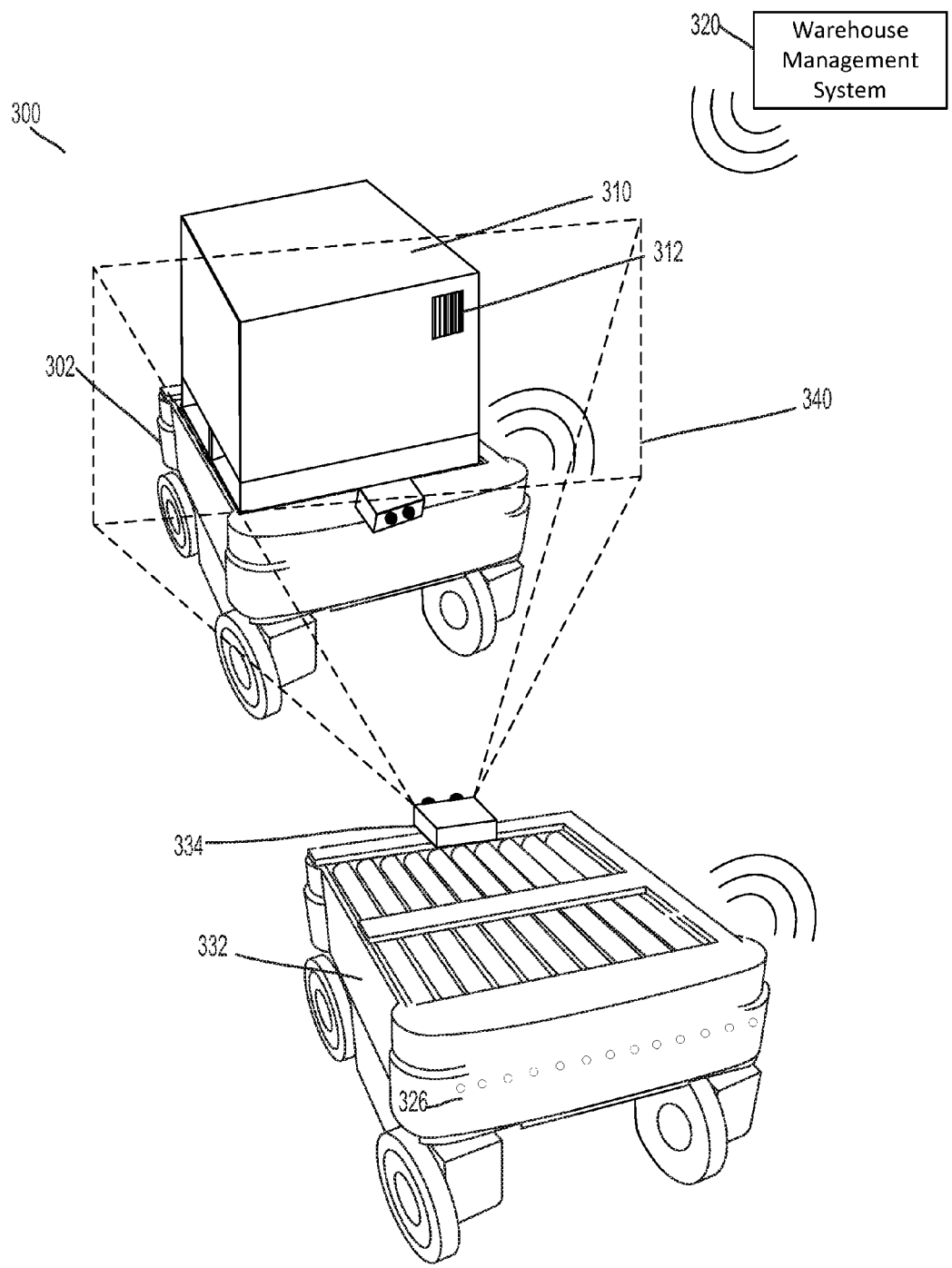

FIGS. 3A and 3B illustrate an example system 300. FIG. 3A shows robotic device 302 carrying an inventory item 310. Robotic device 302 may be an AGV, or may take the form of one or more other robotic devices such as those shown in FIGS. 2A-D. Other forms are possible as well. Robotic device 302 may be deployed in a warehouse environment, and may be configured to move throughout the warehouse environment based on information gathered by one or more sensors mounted on robotic device 302. For example, one or more sensors may be positioned on robotic device 302 such that it can build a full or partial 3D model of its surroundings, which may be used to generate a route or path for movement of robotic device 302. Alternatively, robotic device 302 may move based on commands from a computing system communicatively coupled to robotic device 302. For instance, one or more sensors positioned on robotic device or positioned within the warehouse environment may transmit data to a computing system (e.g., a warehouse management system), which may then generate a route, path, or other navigation instructions for robotic device 302. In additional examples, robotic device 302 may move and/or navigate the warehouse environment based on a combination of both local sensing information and centralized commands from the computing system.

In some examples, robotic device 302 may be configured to transport a first inventory item having a first on-item visual identifier. FIG. 3A shows robotic device 302 transporting inventory item 310, which has corresponding on-item visual identifier 312. While FIG. 3 illustrates an example in which an on-item visual identifier 312 is used, some examples may include the use of other identifiers, such as those described herein.

System 300 may also include a second robotic device 332, shown in FIG. 3B. Second robotic device 332 may be similar or identical to robotic device 302. Second robotic device 332 may have a camera 334, which may be used for navigational purposes and/or to perform one or more actions described herein. Camera 334 may capture image data from a field of view 340. The captured image data may be used for one or more purposes discussed herein, such as navigation, obstacle avoidance, item identification, item verification, and robotic device identification. Camera 304 may include one or more optical sensors configured to capture visual information, such as size, shape, depth, texture, and color, for example. In one embodiment, the optical sensors may include a stereo pair of lenses, which may operate in tandem to provide a 3D image of the field of view of the camera. Camera 304 may also or alternatively include one or more lenses, RADAR sensors, LIDAR sensors, 3D sensors, or other type of sensing equipment. More or fewer lenses or sensors may be used as well.

System 300 may also include a warehouse management system (WMS) 320. As shown in FIGS. 3A-3B, WMS 320 may be separate from robotic device 302 and/or 332, and may be communicatively coupled to one or more robotic devices via wireless connections. Alternatively, in some examples WMS 320 may be coupled to one or more robotic devices via wired connections, and/or may be a component of one or more robotic devices themselves. In other examples, WMS 320 may include components located in both robotic devices and elsewhere, such that performance of the functions of WMS 320 described herein may be done by either a component on a robotic device, a central computing device or system, or a combination thereof. In still other examples, WMS 320 may be distributed across two or more robotic devices, such that a peer-to-peer network of robotic devices including a WMS is formed.

WMS 320 may include one or more communication interfaces operable for communication with a plurality of robotic devices comprising at least the first robotic device and second robotic device described herein. The WMS may also include a processor, and program instructions stored on a non-transitory computer readable medium and executable by the at least one processor to perform one or more functions described herein.

WMS 320 may store information about the plurality of inventory items, robotic devices, and other objects within the warehouse environment. For example, WMS 320 may store the location, contents, size, weight, color, and history associated with one or more items, along with various other characteristics. In addition, WMS 320 may store information about the status of one or more robotic devices, including whether an inventory item is loaded onto a given robotic device or not. This information may be gathered and/or modified based on information received from one or more sensors on the robotic devices and/or placed in the warehouse. In some examples, the information stored for a given item may be an expected value, such as an expected location, expected weight, expected color, etc. These expected values may be updated in the WMS system at any time, such as when an item is moved, for example. During regular use of the warehouse, inventory items may be selected for one or more purposes, and moved from one location to another. This may change the true or actual location of the items. However, the computing system may not always be updated correctly or in a timely manner, which can result in a mismatch between the true location and the expected location. As such, the computing system may not always have correct or current information.

In some examples, WMS 320 may be configured to determine a target inventory item. The WMS may instruct robotic device 302 to move the target inventory item from one location to another within the warehouse. The WMS 320 may also retrieve information corresponding to the target inventory item, such as the expected location, weight, color, on-item visual identifier, or other characteristic. WMS 320 may transmit some or all of this information to robotic device 302, to facilitate robotic device 302 moving the target inventory item. Robotic device 302 may then travel to the expected location of the target item.

Upon arriving at the expected location, robotic device 302 may attempt to verify that the item located at the expected location is the target item. However, in some examples, robotic device 302 may be unable to read an on-item visual identifier of the inventory item. The visual identifier may be misplaced, placed on an opposite side of the item, or the camera of the robotic device may be obstructed or not working. In these instances, among others, it may be beneficial to verify that an object being transported, or set to be transported, by robotic device 302 is the correct item.

To that end, WMS 320 may transmit a request to a second robotic device requesting verification of the on-item visual identifier corresponding to the object being acted upon by the first robotic device 302. In some cases, the request may be sent by first robotic device 302 to WMS 320, which in turn may transmit a request to the second robotic device. As shown in FIG. 3B, second robotic device 332 may capture image data via camera 334, including the on-item visual identifier 312 of inventory item 310. In some examples, the request may be a standing request for a second robotic device close to first robotic device 302 to verify on-item visual identifier 312. The standing request may include any second robotic device with a camera to view the visual identifier, including both mobile devices as well as stationary devices located in the warehouse environment.

In some examples, the verification request may be sent responsive to detecting that the weight of an item picked up by a robotic device is different from an expected weight. Robotic device 302 may determine the weight of an inventory item it is carrying or holding. This may be done by weight sensors, pressure sensors, or other sensors positioned on or around robotic device 302. For instance, robotic device 302 may include a scale used to measure weights, or robotic device 302 may move onto a scale located in the warehouse that can be used to determine the weight of the inventory item. First robotic device 302 may then transmit the weight of the inventory item to WMS 320. WMS 320 may determine an expected weight of the inventory item, such as by retrieving information from memory. WMS 320 may then compare the weight received from robotic device 302 to the expected weight, and responsively transmit a request to verify the on-item visual identifier.

Second robotic device 332 may then position itself such that a camera mounted on robotic device 332 can 'see' inventory item 310 and on-item visual identifier 312. In some examples, the second robotic device may be an AGV or other mobile robotic device. FIG. 3B shows this case in which second robotic device 332 is a second AGV having a camera 334 with a field of view 340. In other examples, the second robotic device may be a stationary robotic device, such as a robotic arm on a pedestal shown in FIG. 2B, or a camera mounted on a wall, shelf, or other part of the warehouse environment. In these examples, the request sent to the second robotic device may include a request to position the camera and/or to capture image data from the camera when first robotic device 302 comes into view.

Second robotic device 332 may then capture image data including on-item visual identifier 312. FIG. 3B shows second robotic device 332 with camera 334 positioned such that it can see inventory item 310 and on-item visual identifier 312. The image data captured by second robotic device 332 includes the image covered by field of view 340. Second robotic device 332 may then transmit the captured image data to WMS 320.

WMS 320 may receive the image data captured by second robotic device 332, and analyze it to detect the first on-item visual identifier. In some examples, detecting the identifier may include scanning or searching the image data for a barcode, QR code, tag, or other on-item visual identifier. The identifier may then be extracted or "read," and a corresponding inventory item may be determined. In some examples, image data may also be received and analyzed to facilitate navigation of a robotic device. This analysis may be performed by the robotic device itself, by the WMS, or by a cloud based computing system.

In some examples, WMS 320 may compare the detected on-item visual identifier to the target on-item visual identifier. The WMS may verify that the inventory item carried by first robotic device 302 has the same visual identifier as the target inventory item. Alternatively, the WMS may determine that the detected on-item visual identifier is not the same as the target on-item visual identifier. A mismatch between the identifiers may indicate that the first robotic device has picked up the wrong inventory item, and/or that some other error has occurred.

Responsive to the comparison, the WMS may perform one or more actions. For example, if the first on-item visual identifier 312 does not match the target on-item visual identifier, WMS may instruct first robotic device 302 to transport first inventory item 310 to an area of the warehouse designated for misplaced or misidentified inventory items. This area may be a predetermined area of the warehouse, and may be located near a human operator that can check each inventory item.

Other actions may be taken responsive to the comparison, including updating the information stored by the WMS corresponding to one or more inventory items in the warehouse environment. Further, the action may include instructing first robotic device 302 to continue moving inventory item 310.

III. Example Methods

Figure 4:
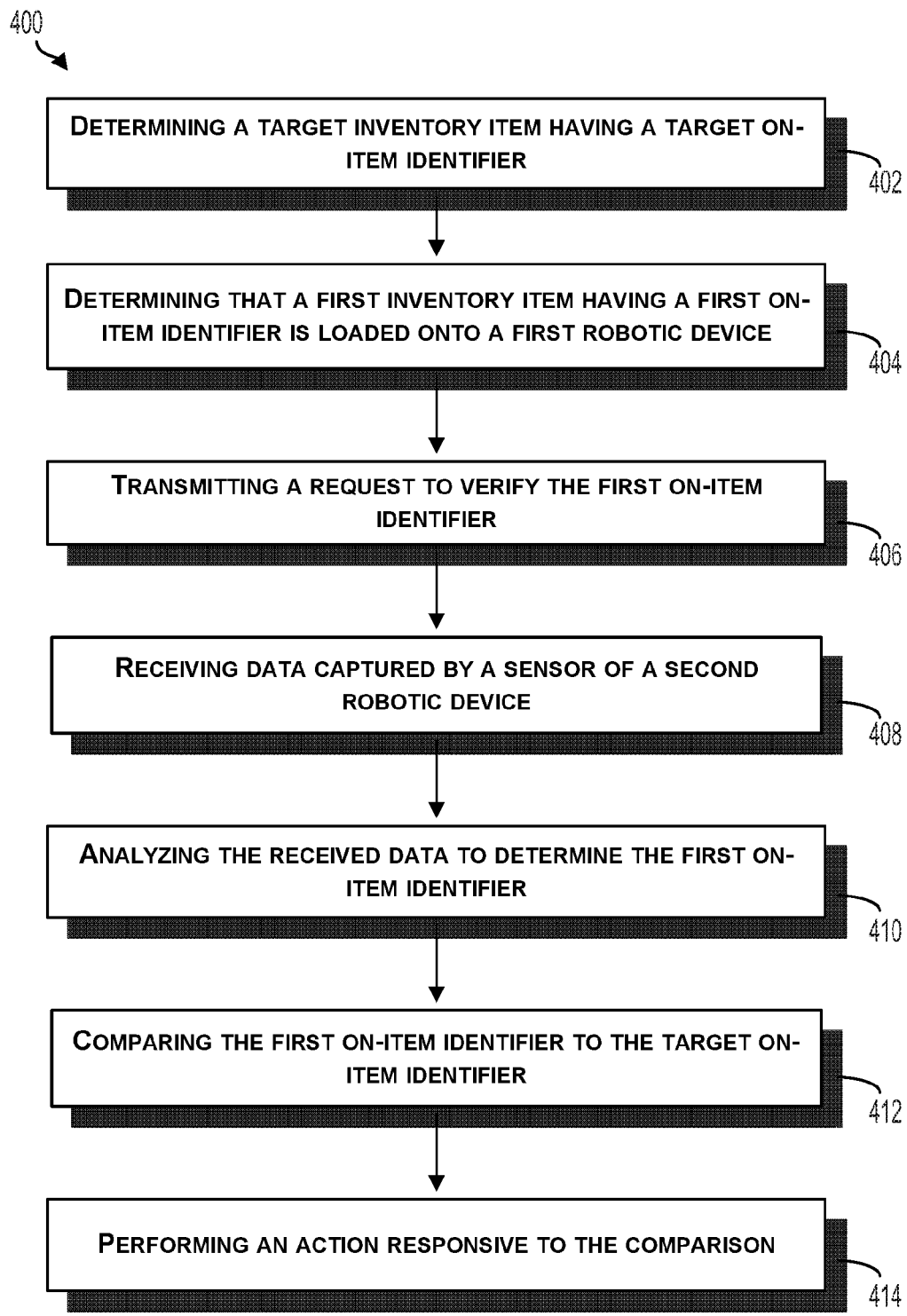
FIG. 4 illustrates a flowchart of an example method, according an example implementation.
Figure 5:
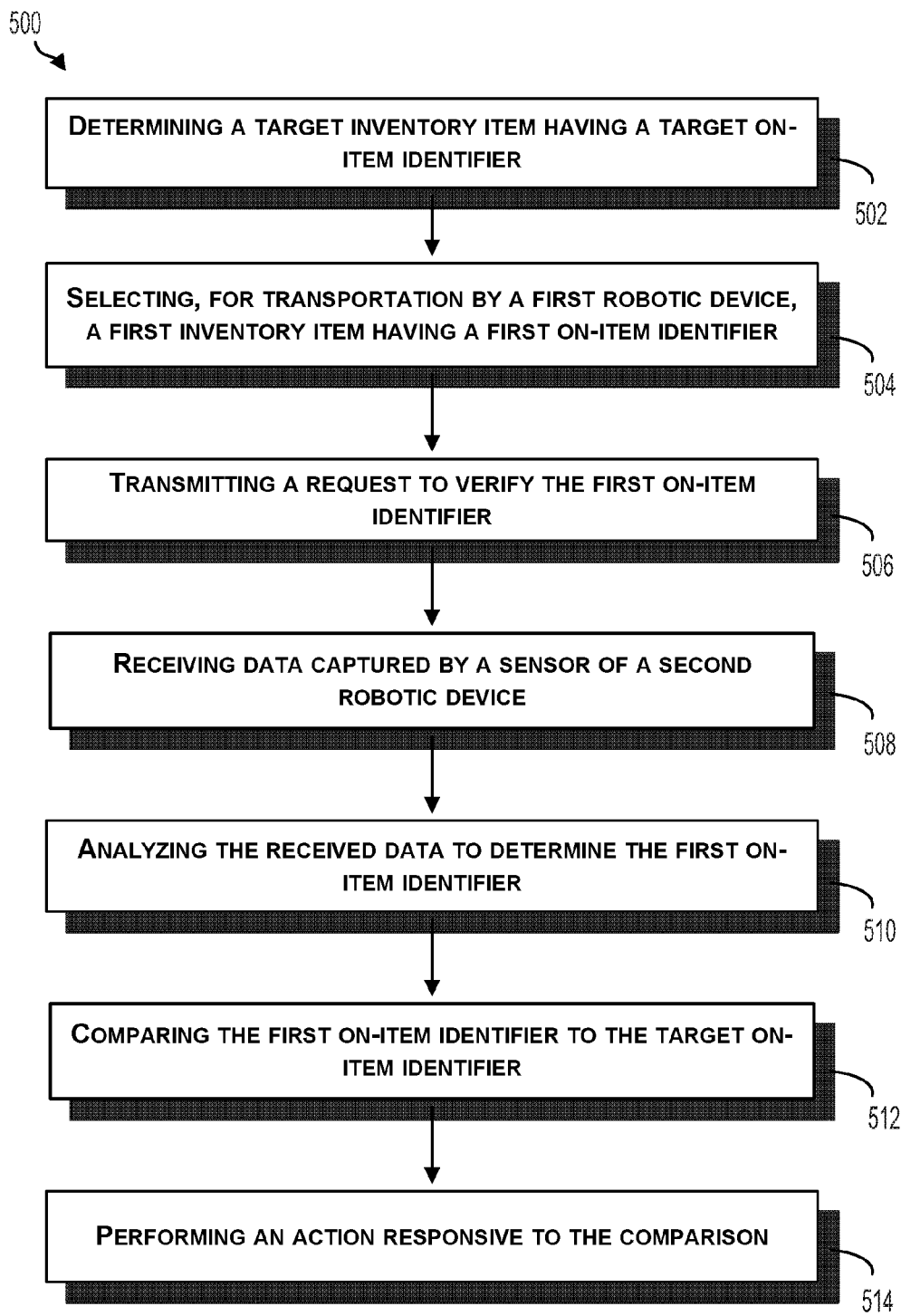
FIG. 5 illustrates a flowchart of an example method, according an example implementation.

FIGS. 4 and 5 show flowcharts of example methods 400 and 500 respectively, according to example embodiments. Methods 400 and 500 may be carried out by any of the devices or systems described herein, such as the robotic devices shown in FIGS. 2A-2D, and 3A-3B, and/or the computing systems and warehouse management systems described herein. Methods 400 and 500 may be carried out in a warehouse environment having a plurality of inventory items located therein, each inventory item having a corresponding on-item visual identifier.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowcharts shown in FIGS. 4 and 5. Where used, program code can be stored on any type of computer-readable medium, for example, such as a storage device including a disk or hard drive.

In addition, each block of the flowcharts shown in FIGS. 4 and 5 may represent circuitry that is wired to perform the specific logical functions in the process. Unless specifically indicated, functions in the flowcharts shown in FIGS. 4 and 5 may be executed out of order from that shown or discussed, including substantially concurrent execution of separately described functions, or even in reverse order in some examples, depending on the functionality involved, so long as the overall functionality of the described method is maintained.

At block 402 of FIG. 4, method 400 may include determining a target inventory item having a target on-item identifier. The target inventory item may be an inventory item scheduled for movement from one location to another within the warehouse, for shipment to another location outside the warehouse, or designated for some other purpose such as maintenance or checking the target inventory item's contents.

In some examples, the WMS may determine or select the target inventory item. The target inventory item may be determined based on one or more factors considered by the WMS. For instance, in a fulfillment warehouse, a given inventory item may be selected as the target inventory item when the WMS receives an order for that particular item. In other examples, the target inventory item may be determined or selected by a robotic device or WMS distributed across a plurality of robotic devices, rather than a centralized WMS. Further, the target inventory item may be located at a target location on a shelf in the warehouse, such that a robotic device may travel to the target location to pick up the item. Alternatively, the target item may be an item that is currently being carried by a robotic device.

Once a target inventory item is determined, if a robotic device is not already carrying the item, a first robotic device may be dispatched to the expected location of the target inventory item within the warehouse. The WMS may transmit instructions and data to the first robotic device including the expected location of the target inventory item and/or navigation instructions to get to the expected location.

At block 404, method 400 may include determining that a first inventory item having a first on-item identifier is loaded onto a first robotic device. This may be determined by one or more sensors on the first robotic device, and/or one or more sensors located within the warehouse environment (e.g., cameras, weight sensors, etc.). In some examples, the first robotic device may travel to the location of the target item indicated by the WMS, and may pick up an inventory item in that location. As such, the first inventory item may be the inventory item that the WMS and robotic device expect to be the target inventory item. But the first robotic device may not be able to verify that the first inventory item is the target inventory item, due to the positioning or obstruction of a camera or other sensor of the first robotic device, for example. First robotic device may nonetheless pick up the first inventory item and transport it.

Alternatively, if the first robotic device is already carrying an inventory item, the first robotic device may not be able to verify that it is carrying the target inventory item, again due to the positioning or obstruction of a camera or other sensor of the first robotic device, for example.

Where the first robotic device is unable to verify that the first inventory item is the target inventory item, it may be beneficial to have a second robotic device perform a verification step. To that end, at block 406, method 400 may include transmitting a request to verify the first on-item identifier. In some examples, this request may be sent by the first robotic device itself to a second robotic device. Alternatively, the request may be sent by the first robotic device to the WMS, or from the WMS to the second robotic device. In response, where the second robotic device is a mobile robotic device, the second robotic device may travel to the location of the first robotic device.

In other examples, transmitting the request to verify the first on-item visual identifier may include transmitting an instruction to the first robotic device to travel to the location of a second robotic device. This may include the first robotic device moving to a designated area in the warehouse that includes a stationary second robotic device including a camera.

The request to verify the first on-item identifier may be sent responsive to determining that the first robotic device cannot verify the item it is carrying by itself. Or, the request may be sent responsive to determining that the weight of the first inventory item being carried by the first robotic device does not match or is not within a margin of error of an expected weight of the target inventory item.

In some examples, method 400 may include determining an expected weight of the target inventory item. This may include the WMS retrieving an expected weight associated with the target inventory item. The method may then include the first robotic device determining the weight of the first inventory item it is carrying. The expected weight of the target inventory item and weight of the first inventory item may then be compared, and based on this comparison the request to verify may be transmitted. Put simply, a difference in weight may be used to determine whether verification should be performed.

At block 408, method 400 may include receiving data captured by a sensor of a second robotic device. In some examples, this may be image data captured by a camera of the second robotic device. The second robotic device may move into a position near the first robotic device, and may position its camera or other sensor to capture the on-item identifier associated with the first inventory item.

At block 410, method 400 may include analyzing the received image data to determine the first on-item identifier. In some examples, the received data may be analyzed by the second robotic device and/or the WMS. Determining the first on-item identifier may include performing an analysis on the received data, such as pattern recognition, for example.

At block 412, method 400 may include comparing the first on-item identifier to the target on-item identifier. This comparison may verify whether or not the first inventory item is the target inventory item.

Then, at block 414, method 400 may include performing an action responsive to the comparison. The WMS, first robotic device, and/or second robotic device may perform an action based on the comparison. For example, if it is determined that the first on-item identifier and the target on-item identifier are not the same, the first robotic device may transport the first inventory item to a designated area within the warehouse for mislabeled or misidentified items. In other examples, if the identifiers are not the same, the WMS may add the first inventory item or target inventory item to a list, and/or may transmit instructions to one or more robotic devices. Alternatively, if it is determined that the first on-item identifier and the target on-item identifier are the same, the first robotic device may pick up or continue moving the first inventory item according to previous instructions. Further, responsive to the comparison the WMS may update information stored corresponding to the first inventory item and/or target inventory item.

FIG. 5 shows a flowchart of example method 500. Method 500 may be similar or identical in some respects for method 400. For example, blocks 502, and 506-514 may be similar or identical to blocks 402 and 406-414. However, method 500 may include block 504, which may include selecting, for transportation by a first robotic device, a first inventory item having a first on-item identifier.

In some examples, a first robotic device may be tasked with moving a target inventory item (determined by a WMS, for example), and may be instructed to go to a target location corresponding to the target item. The first robotic device may travel to the target location, and may detect an inventory item in that location. This inventory item may be the first inventory item. However, the first robotic device may not be able to verify that the first inventory item located in the target location is the target inventory item. The first robotic device's camera may be obstructed, or the on-item identifier of the first inventory item may be located on a side opposite from the first robotic device. Nonetheless, the first inventory item may select the first inventory item for transportation.

A request to verify the first on-tem identifier may then be transmitted. In some examples, this may involve instructing a second robotic device to travel to the target location to view the first inventory item from a different side of the item. In other examples, it may include instructing the first robotic device to travel to a location at which a second robotic device or sensor can be used to verify the first inventory item. In a particular example, the first inventory item may be located on a shelf, and the first on-item identifier may be a barcode located on the back side of the item facing away from an aisle in which the first robotic device is located. In this case, a second robotic device may be dispatched to the aisle on the back side of the first inventory item, so that the first on-item identifier can be read.

IV. Example Variations

Example systems and methods described herein may further include determining the expected and actual location of one or more inventory items, and using the locations as a basis to perform one or more actions, such as those described above.

Methods 400 and 500 may further include determining an expected location of the target inventory item. The expected location may be the location of the target inventory item stored by the WMS. The location of the first inventory item may also be determined, such as by the first robotic device. These two locations may then be compared, and a match or difference below a threshold may provide an added metric of verification that the first inventory item is the target inventory item. This second level of verification may be beneficial in some cases. The comparison may include determining that the expected location of the target inventory item and the location of the first inventory item correspond to each other, and/or are within a threshold distance or within a margin of error.

Then, based on both the comparison of the locations as well as the comparison of the on-item visual identifiers, the WMS and/or first or second robotic device may perform an action, such as transmitting instructions or moving the inventory item. As such, the actions described with respect to blocks 414 and 514 of methods 400 and 500 may be performed responsive to both (i) comparing the detected first on-item visual identifier and the target on-item visual identifier, and (ii) determining that the expected location of the target inventory item and location of the first inventory item correspond to each other.

Examples included herein may be described with reference to on-item visual identifiers. But in some examples, the acts and/or functions described herein may be performed and carried out with respect to non-visual on-item identifiers. For instance, inventory items may have non-visual on-item identifiers such as RFID tags. Further, examples may include robotic devices having sensors configured to capture the non-visual on-item identifiers, and computing systems described herein may be configured to receive data captured by the sensors, analyze the data to determine the on-item identifiers, compare various identifiers, and responsively perform one or more actions.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. In a warehouse environment having a plurality of inventory items located therein, each having a corresponding on-item identifier, a method comprising:
    determining a first robotic device has a transport assignment to transport a target inventory item from the plurality of inventory items, the target inventory item having a target on-item identifier;
    determining that a first inventory item has been loaded onto the first robotic device in response to the transport assignment;
    receiving image data captured by an image sensor of a second robotic device, wherein the second robotic device is arranged for transport of inventory items, and wherein the first and second robotic devices are separately movable in the warehouse environment;
    analyzing the received image data to: (a) determine that at least a portion of the first robotic device is in a field of view of the image sensor of the second robotic device, and responsively (b) detect a first on-item identifier of the first inventory item loaded on the first robotic device;
    based at least in part on a comparison of the first on-item identifier and the target on-item identifier, determining whether or not the target inventory item is loaded on the first robotic device; and
    responsive to the determination as to whether or not the target inventory item is loaded on the first robotic device, performing an action.

2. The method of claim 1, wherein the first robotic device has an image sensor configured to capture image data of an environment of the first robotic device, and wherein the image sensor of the first robotic device is obstructed from capturing the first on-item identifier.

3. The method of claim 1, wherein each of the on-item identifiers is a barcode.

4. The method of claim 1, further comprising:
    determining an expected weight of the target inventory item;
    determining, by the first robotic device, a weight of the first inventory item;
    comparing the expected weight of the target inventory item to the determined weight of the first inventory item; and
    responsive to the comparison, transmitting a request to verify the first on-item identifier.

5. The method of claim 1, wherein the second robotic device stops movement to capture the image data.

6. The method of claim 1, wherein performing the action responsive to comparing the first on-item identifier and the target on-item identifier comprises causing the first robotic device to transport the first inventory item to a predetermined location in the warehouse environment.

7. The method of claim 1, further comprising:
    determining an expected location of the target inventory item;
    determining, a location of the first inventory item; and
    determining that the expected location of the target inventory item and the location of the first inventory item correspond to each other,
    wherein performing the action comprises performing the action responsive to (i) comparing the first on-item identifier and the target on-item identifier, and (ii) determining that the expected location of the target inventory item and location of the first inventory item correspond to each other.

8. The method of claim 1, further comprising instructing the first robotic device to transport the target inventory item from a first location to a second location.

9. The method of claim 8, wherein the performing the action comprises transporting the first inventory item to the second location.

10. A warehouse management system comprising:
    a communication interface operable for communication with a plurality of robotic devices comprising at least a first robotic device and a second robotic device, wherein the first and second robotic devices are both arranged for transport of inventory items in a warehouse environment having a plurality of inventory items, wherein each inventor item has a corresponding on-item identifier, and wherein the first and second robotic devices are separately movable in the warehouse environment;
    a processor; and
    program instructions stored on a non-transitory computer readable medium and executable by the processor to:
        determine the first robotic device has a transport assignment to transport a target inventory item from the plurality of inventory items, the target inventory item having a target on-item identifier;

determine that a first inventory item has been loaded onto the first robotic device in response to the transport assignment;

receive image data captured by an image sensor of the second robotic device;

analyze the received image data to: (a) determine that at least a portion of the first robotic device is in a field of view of the image sensor of the second robotic device, and responsively (b) detect a first on-item identifier of the first inventory item loaded on the first robotic device;

based at least in part on a comparison of the first on-item identifier to the target on-item identifier, determine whether or not the target inventory item is loaded on the first robotic device; and responsive to the determination as to whether or not the target inventory item is loaded on the first robotic device, perform an action.

11. The system of claim 10, wherein the first robotic device has an image sensor configured to capture image data of an environment of the first robotic device, and wherein the image sensor of the first robotic device is obstructed from capturing the first on-item identifier.

12. The system of claim 10, wherein:

the first robotic device is further configured to determine a weight of the first inventory item; and the program instructions are further executable to:

determine an expected weight of the target inventory item;

compare the expected weight of the target inventory item to the determined weight of the first inventory item; and responsive to the comparison, transmit a request to verify the first on-item identifier.

13. The system of claim 10, wherein the second robotic device stops movement to capture the image data.

14. The system of claim 10, wherein each of the on-item identifiers is a barcode.

15. The system of claim 10, wherein performing the action responsive to comparing the first on-item identifier and the target on-item identifier comprises instructing the first robotic device to transport the first inventory item to a predetermined location in the warehouse environment.

16. The system of claim 10, wherein the program instructions are further executable to:

determine an expected location of the target inventory item;

determine a location of the first inventory item; and determine that the expected location of the target inventory item and the location of the first inventory item correspond to each other, wherein performing the action comprises performing the action responsive to (i) comparing the first on-item identifier and the target on-item identifier, and (ii) determining that the expected location of the target inventory item and location of the first inventory item correspond to each other.

17. In a warehouse environment having a plurality of inventory items located therein, each having a corresponding on-item identifier, a method comprising:

determining that a target inventory item from the plurality of inventory items should be located on a first robotic device arranged for transport of items, the target inventory item having a target on-item identifier;

receiving image data captured by an image sensor of a second robotic device, wherein the second robotic device is arranged for transport of inventory items, and wherein the first and second robotic devices are separately movable in the warehouse environment;

detecting the first robotic device in the received image data;

responsive to detecting the first robotic device in the received image data, searching the received image data for on-item identifiers, wherein the search detects a first on-item identifier;

comparing the first on-item identifier and the target on-item identifier to determine whether or not the target inventory item is loaded on the first robotic device; and responsive to the determination as to whether or not the target inventory item is loaded on the first robotic device, performing an action.

18. The method of claim 17, wherein performing the action comprises transporting the first inventory item from a first location to a second location.

19. The method of claim 17, wherein the first robotic device has an image sensor configured to capture image data of an environment of the first robotic device, and wherein the image sensor of the first robotic device is obstructed from capturing the first on-item identifier.

20. The method of claim 17, further comprising:

determining an expected weight of the target inventory item;

determining a weight of the first inventory item;

comparing the expected weight of the target inventory item to the determined weight of the first inventory item; and responsive to the comparison, transmitting a request to verify the first on-item identifier.

* * * * *